INVENTOR
JAMES J. LAMB

BY
Griffin and Stokes
ATTORNEYS

Nov. 21, 1967 J. J. LAMB 3,354,432

DOCUMENT READING SYSTEM

Filed Feb. 23, 1962 3 Sheets-Sheet 2

Nov. 21, 1967 J. J. LAMB 3,354,432

DOCUMENT READING SYSTEM

Filed Feb. 23, 1962 3 Sheets-Sheet 3

3,354,432

DOCUMENT READING SYSTEM

James J. Lamb, Sierra Vista, Ariz., assignor to Sperry Rand Corporation, New York, N.Y., a corporation of Delaware Filed Feb. 23, 1962, Ser. No. 175,033
10 Claims. (Cl. 340—146.3)

This invention relates to an improvement in document reading systems, and more particularly to one wherein is employed a digital code incorporated in the minute structure of the character.

In recent years, there has been intensive effort in the field of character and pattern recognition whereby alphanumeric characters or the like, which are printed upon a carrier member such as paper, can be sensed and identified by mechanical means for use in data processing systems without need for human intervention. Such so-called "human language characters" are to be distinguished from permutations and combinations of code elements such as Morse codes, punched paper tape codes, etc. These devices find extensive use in processing printed data relating to commercial transactions as, for example, bank checks, mail, and the like. The prior art has devised many different forms of character recognition systems as evidenced by the large number of U.S. patents. For example, prior art character recognition systems which employ a multiple scan technique for determining the gross outline of a printed character are disclosed in patents to Flory et al. (2,615,992), Shepard (2,663,758), Rabinow (2,933,246), Scarrott (2,985,366), and Buslik (2,985,863). Other systems employe a stationary masking technique for determining the character, such as is shown in the patent to Vroom (2,723,308). A relatively recent development in this field is the printing of characters in magnetic ink whereby the use of a read head during one scan generates a wave form whose envelope uniquely identifies the character. This technique is shown in patents to Eldredge (2,992,408 and 3,000,000), and is one developed at the Stanford Research Institute commonly referred to as the ERMA system.

In each of the above-cited references, the printed character recognized by the system has a gross outline which is visually legible to the human observer without ambiguity. However, the reading apparatus must recognize this form by an appropriate scanning procedure in order to generate, by intermediate circuit means, a digital identification of the character which can be used by data processing equipment or the like. Therefore, fairly complicated circuitry is required in order to effectively translate the printed character into a suitable form for processing.

In order to obviate some of the problems inherent in such complicated circuitry, the prior art has also devised character reading systems for sensing a recorded character which incorporates a digital code within the gross structure of the character itself. Examples of such systems can be found in patents to Chaimowicz (2,784,392), Broido (2,942,778), and Reumerman et al. (2,980,801). This technique permits the use of relatively simple sensing circuitry in that the scanning transducer directly generates a digital output which can be utilized by a processing system. However, two primary disadvantages are inherent in this technique of encoding in the gross structure of a character, which are: (1) the encoding often renders the visual gross outline of the character, as seen by the human observer, less intelligible which thereby increases the possibility for mistakes on his part, and (2) such recorded characters are normally incompatible with character recognition systems of the prior art which employ the form recognition principle. In other words, a character printed with a digital code in its gross outline cannot normally be identified by those systems disclosed in the patents cited in the above paragraph, especially where these systems must also recognize characters without such encoding.

The present invention provides a novel document reading system which is a compromise betwen the above two diverse approaches of the prior art. Digital encoding is incorporated within the minute structure of the printed character in such a fashion that its visual gross outline to the human observer or to a form recognizing circuit is not adversely distorted. The novel structure of the character in the preesnt invention is particularly adapted for identification by the so-called ERMA system described above. The present invention is also designed to require only one scan across the character in order that it may be recognized. Thus, the invention provides both circuit simplicity in that the ultimate identifying information is generated directly from the transducing means, as well as compatibility with prior art systems which recognize gross form, with the number of different character forms recognizable being limited only by the binary coding ($2^n$).

It is accordingly an object of the present invention to provide a document reading system for identifying a printed character having digital encoding incorporated into its minute structure in such a fashion to prevent distortion of its gross visual outline.

A further object of the present invention is to provide a document reading system for generating the final identifying digital information directly from the scanning transducer with variety of characters limited only by the binary coding combination, i.e., $2^n$.

Yet another object of the present invention is to provide a printed human language character incorporating digital coding therein which does not materially effect legibility of the character to the human observer and which is also capable of being read by form recognition scanning systems.

In general, the present invention provides that the minute structure of the character contains an identifiable code pattern which is not visible to the human observer. This is accomplished by a character comprised of parallel fine lines of visually distinguishable and mechanically sensible material which are recorded on a carrier surface one in each of a plurality of closely spaced parallel line positions, with said lines being interrupted or terminated in a manner to provide a visual gross outline of the character, where one or more lines are selectively omitted from a predetermined group of said spaced line positions in order to incorporate digital encoding of said character within its minute structure. The line material utilized may comprise substances such as magnetic ink, or material which has optical characteristics different from those of the carrier member so that optical scanning means may be employed. Each recorded line in a line position produces a separate pulse when the character is fed pass a scanning head. Thus, when the predetermined code group of line positions is scanned, the signal generated by the transducer is indicative of the code uniquely identifying said character. In the preferred embodiment of the invention, the predetermined code group is intermediate leading and trailing line position groups of said character, in which groups line material is printed so as to provide a series of pulses for alerting the scanning equipment as to the exact location of the predetermined code group.

It is, therefore, another object of the present invention to provide a novel document reading system for identifying characters having a predetermined code group of line positions within its minute structure with selective printing of machine sensible line material therein.

A further object of the present invention is to provide a novel document reading system for identifying characters comprised of parallel line positions wherein a predetermined code group of line positions is intermediate other line positions, with the latter containing material for alerting the scanning system as to the location of the code group.

These and other objects of the present invention will become apparent during the course of the following description, which is to be read in conjunction with the drawings, in which:

FIGURES 1*a* and 1*b* illustrate the composition of the recorded character to be identified;

Figure 4:
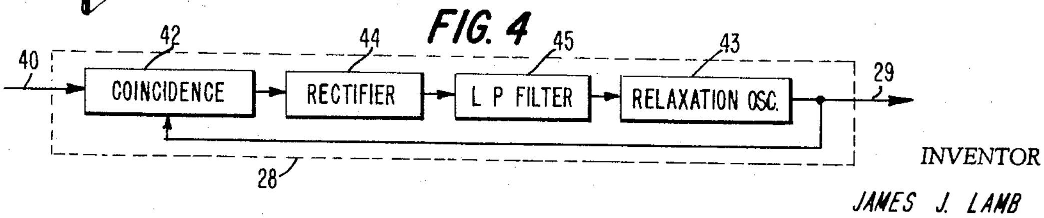
Figures 3, 5:
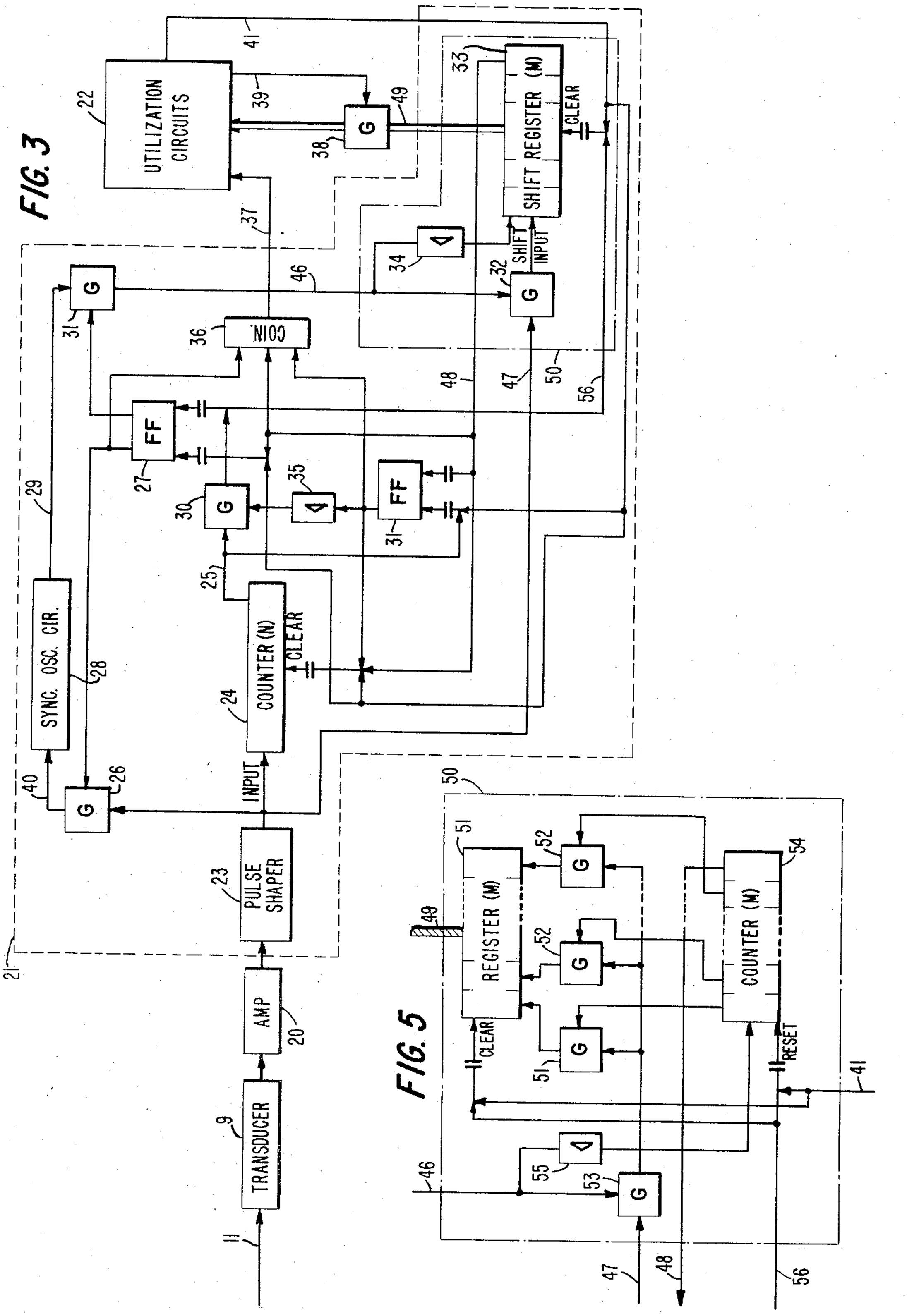
FIGURE 3 shows details of one preferred circuit embodiment for isolating the character code pulses from the make-ready and terminate pulses.
Figure 7:
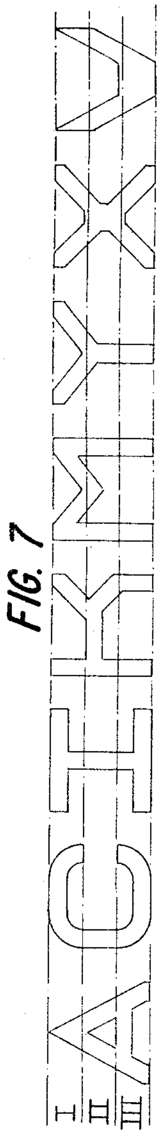
Figures 6, 8, 9:
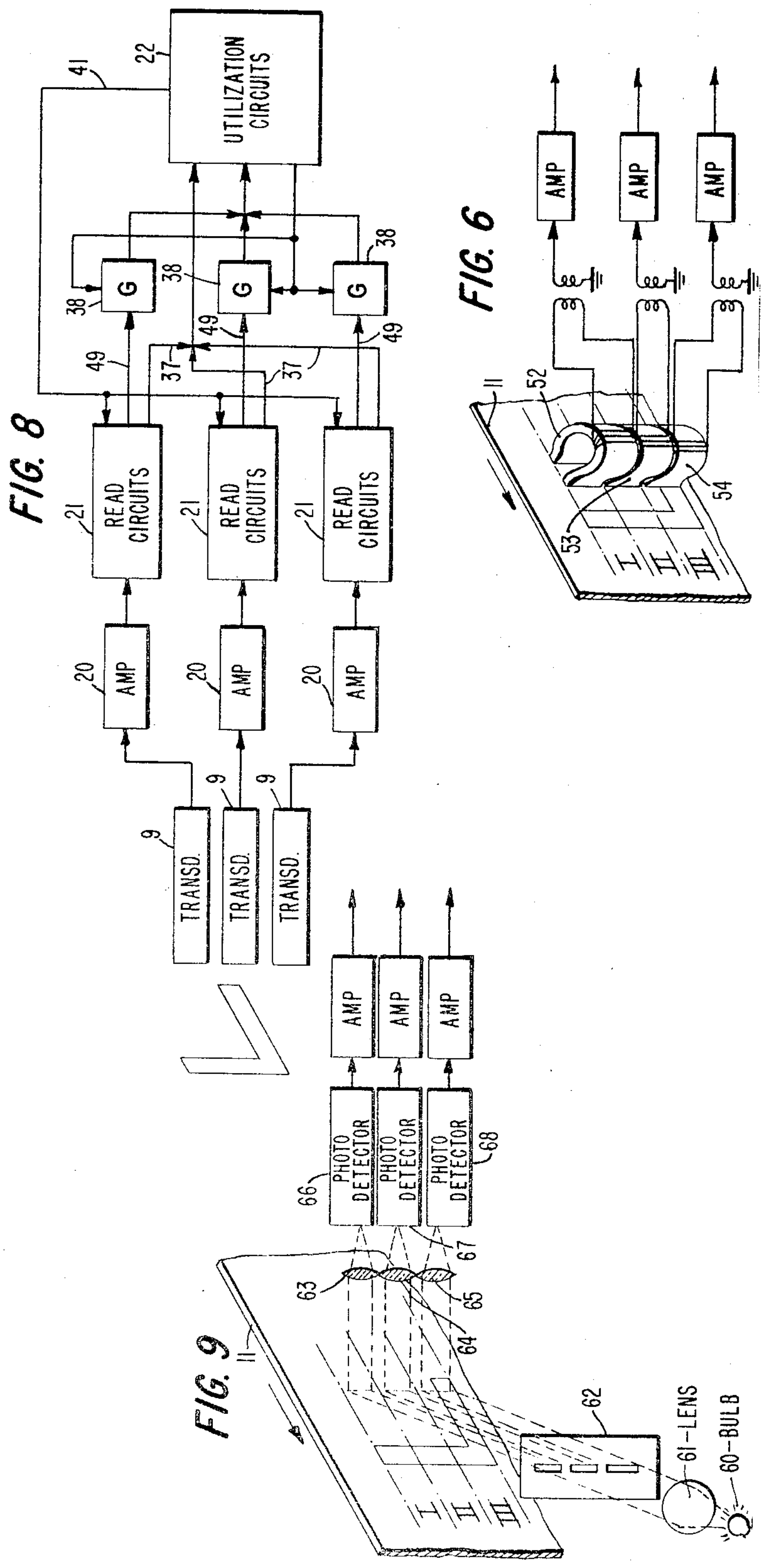

FIGURE 4 discloses one form of a circuit used in FIGURE 3 for generating clock pulses;

FIGURE 5 illustrates an alternative circuit embodiment which is a modification of the circuit shown in FIGURE 3;

FIGURE 6 shows plural magnetic transducing means for eliminating the adverse effects of skew smearing when scanning the recorded character;

FIGURE 7 illustrates typical gross outlines of characters for use with the scanning mechanism of FIGURE 6;

FIGURE 8 shows the interconnection of read circuits for the transducers of FIGURE 6; and FIGURE 9 shows optical scanning transducer means which may be alternatively used in the novel document reading system.

Figure 1A:
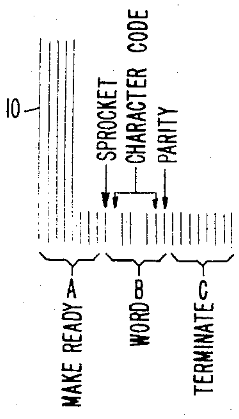
Figure 1B:
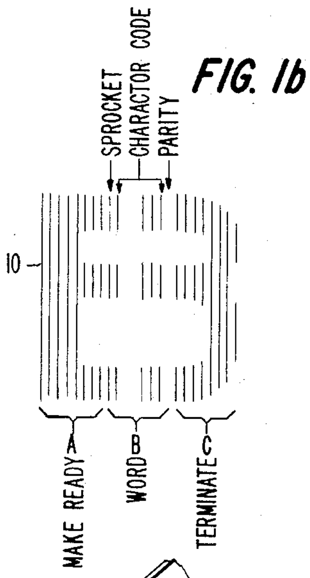

Referring first to FIGURE 1, there are shown two typical alphabetic characters as they may appear on a printed surface or on the faces of metallic type used for printing said characters on a surface. Each character, when printed on a surface, is comprised of a series of fine parallel lines 10 of visually distinguishable material which are recorded on the surface one in each of a plurality of closely spaced line positions, with said lines 10 being interrupted or terminated in a manner to provide a visual gross outline or envelope of said character. For example, FIGURE 1*a* shows the gross outline of the letter "L" which is comprised of a series of vertical lines 10 most of which are terminated so as to have their length only partially that of the full height of the character. In FIGURE 1*b*, the vertical lines 10 are interrupted in such a manner that their envelope defines the alphabetic letter "B." The size of the letters in FIGURE 1 is greatly exaggerated in order to emphasize their fine line composition which would not be apparent to the naked eye when the letters are of actual typewriter or printed size.

A digital code combination uniquely representative of the character to be read is incorporated into the minute structure of the character in the following manner. In the particular combination illustrated in FIGURE 1*a*, there are tweny-four spaced line positions of which a certain number, for example the center eight, constitute binary order positions or the like in a typical digital code such as the UNIVAC 8-element binary code. The 8 vertical line positions, which make up the left-most group labeled A, have printed therein visual line material in each of the positions although as shown, several of these printed lines are interrupted in order to form a portion of the horizontal leg of the character. Following this left-most group is a center 8-line region or group labeled B, which is then followed by a final group of 8 vertical line positions labeled C. The right-most group C also has visual line material printed in each of its line positions as indicated in the figure. The center region or group B of eight vertical line positions contains a 6-binary element character code combination for the particular character printed, as well as holding a parity bit and a synchronization bit (known as a "sprocket" pulse generating element). Neither the sprocket nor parity line positions in the central region B are absolutely required, but where the sprocket line position is provided, a visual line of material is always printed therein.

FIGURE 1*b* discloses a similar format for the alphabetic character "B" in which regions A, B, and C are also provided. As noted before in connection with FIGURE 1*a*, FIGURE 1*b* shows visual line material printed in each of the line positions in group A and in group C, whereas the character code line positions of group B may or may not have visual line material therein depending upon the binary code combination used to represent this character.

Within the character code line positions of center region B, any digital code may be utilized in order to afford a digital recognition of the visual character. In the disclosed embodiments of the invention, a binary code is employed such that each line position of the character code portion has a binary order significance attached thereto. For example, the left-most line position of the character code portion may hold the lowest order binary bit of the combination, said bit having a value either of 0 or 1 depending upon the absence or presence of visual line material printed therein. In FIGURE 1*a*, this lowest order binary bit position is seen to be empty of visual line material, which conventionally implies that the binary bit held in this order position has a value of 0. However, in FIGURE 1*b*, the left-most line position of the character code portion is seen to have visual line material printed therein so that its binary bit value equals 1. The parity line position of central region B may or may not contain visual line material depending upon several factors, one of which is the type of parity being employed, i.e., even or odd. As before emphasized, a parity line position need not be included within a central portion B, or if included, can alternatively be placed immediately adjacent to the sprocket line position instead of at the location shown.

The total number of line positions within the character code portion will in general depend upon the total number of unique characters (including alphabetic, numerical, and special symbols) which are to be recognized, together with other practical considerations such as the maximum number of adjacent line positions which can be left unfilled with visual material without substantially or adversely imparing the visual identification of the character. In most cases, a six element binary code is sufficient to uniquely represent $2^6=64$ different characters if it is possible to leave unfilled all six line positions comprising the character code portion of central region B. However, if this amount of blank space cannot be tolerated due to distortion of the visual gross outline of the character, then additional binary line positions may be required in the character code portion in order that at least several of these line positions will always have visual material recorded therein. The exact number of character code line positions will therefore depend upon all of these factors, which in turn hinge upon the particular environment in which the invention is to be used. Furthermore, other coding systems may be employed, such as the reflected and excess-three codes well known to the art.

As an alternative to the line regions A and C as shown in FIGURE 1, solid visual material could precede and follow the code formed center region B of the character's gross structure. However, there are logical advantages in having a fixed character width of uniform line spacing such as that provided by the completely line constituted character here shown. This logical advantage derives from the fact that a leading group of printed lines (for example group A in FIGURE 1) can be used to provide "make ready" signals to the read circuits in order that they may be properly conditioned to accurately sense the center region B containing the character code and other related elements. Furthermore, the trailing group of completely printed line positions (for example group C) may serve to terminate the read circuit functioning for a particular character. Thus, the use of these two terminal groups of line positions insures that there is no ambiguity as to location of the median group B which includes the identifying character code combination.

Figure 2:
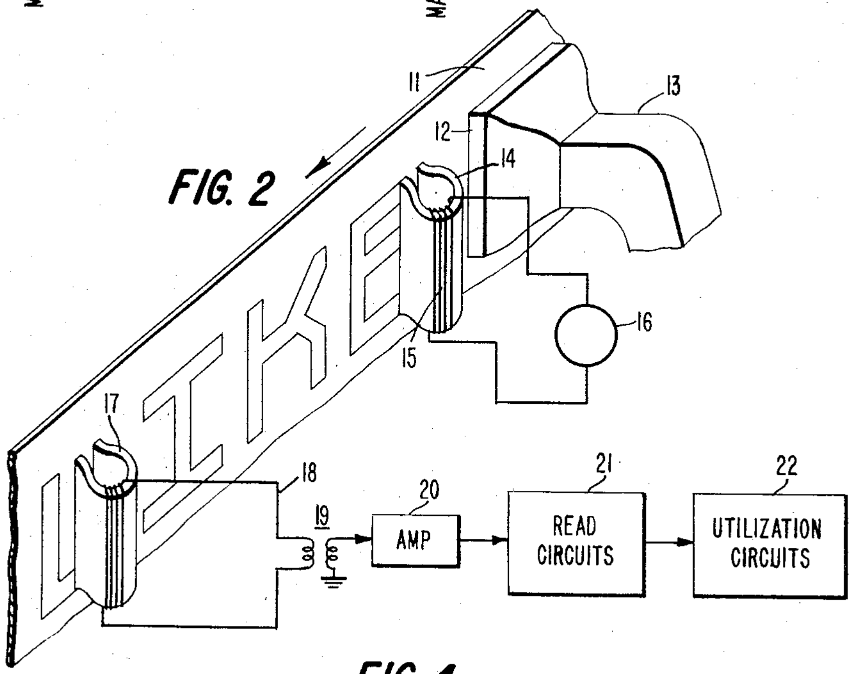
FIGURE 2 shows one scheme for scanning the recorded character by magnetic transducer means.

Several methods of scanning and recognizing the code combination in the minute structure of the character may be employed. One such method is to print the character using material which is either magnetized or which can be magnetized upon exposure to a field. FIGURE 2 illustrates one embodiment of the invention which senses and recognizes such magnetic characters. In the use of this system, each character is printed on the surface of a carrier member 11 with magnetic ink either by direct imprinting or my imprinting from a special ribbon that has previously been coated with the magnetic film, as in the well known typewriter technique. Thus, a type face 12 carried by a print hammer 13 may be employed in the manner diagrammatically illustrated in FIGURE 2. The type face 12 can be lined or enegraved in the manner shown in FIGURE 1 in order to record on the surface of carrier 11 a plurality of parallel spaced fine lines of visually distinguishable magnetic material, with said lines forming the gross outline or envelope of a particular character. In most magnetic recording systems, the character, when initially printed, develops no field about it but must be subsequently passed through a magnetic field in order to orient the poles of the magnetic material of which it is comprised. This technique is employed in FIGURE 2 whereby it is seen that carrier member 11 moves in the direction of the arrow so that each recorded character passes beneath the pole faces of a magnetic head 14 whose air gap is parallel to the line structure of the character (vertical, in the illustrated embodiment). The width of head 14 in the embodiment of FIGURE 2 is such as to span the entire maximum heights of any of the characters which can be printed on the carrier member. The magnetizing field across the air gap of head 14 may either be fixed (DC), or AC. However, for high speed reading of the printing characters, a fixed DC field is preferable. This field is set up by means of a suitably wound coil 15 energized by a source of either DC or AC potential 16.

Subsequent to the magnetization of each of the printed fine lines of a character, said character is passed beneath the pole faces of a read head 17 whose air gap is also oriented parallel to the character line structure in the same fashion as magnetizing head 14. In FIGURE 2, the width of the head is shown to be equal to the maximum height of any of the characters to be recognized, so that material printed in any portion of a line position will pass beneath a portion of the read head. As the magnetized lines or segments of lines sequentially pass under the reading head, the relative motion between said read head 17 and carrier member 11 cause voltage pulses to be induced in the coil of read head 17 which appear on output conductors 18 as a train of pulses. Spaces appear in this pulse train whenever a line position passes under read head 17 in which there is no recorded magnetized material. These pulses on conductor 18 are directed to an amplifier 20 via a transformer 19 where they are suitably amplified for further transfer to read circuits 21. These read circuits, in the preferred embodiments, are conditioned by the group A pulses in order to anticipate the succeeding pulses and spaces which are generated by the median group B. Thereafter, the pulses induced in the read head by the printed lines in group C are utilized to terminate the read operation and reset read circuits 21 for the subsequent identification of the next following character. Thus, read circuits 21 essentially extract the pulses representing the character code (including sprocket and partiy pulses if present) and forward same to any one of several different kinds of utilization circuits 22 depending upon the environment in which the invention finds itself. For example, circuits 22 might be the write amplifiers of a magnetic tape unit for recording the code combination of each character in a plurality of channels thereon, one channel for each code element, parity, and sprocket. Alternatively, circuits 22 might include calculating equipment for processing coded alpha-numeric characters.

FIGURE 3 shows one form of read circuits 21 which can be utilized to accomplish the above-described function. A pulse train is generated from transducer 9 (which may be a magnetic read head as shown in FIGURE 2) and suitably amplified and passed to a pulse shaper 23, if necessary, in order to provide uniform substantially square wave pulses for use in the digital read circuits. The first series of pulses to arrive at read circuits 21 are those caused by the make-ready lines in group A of the sensed character. It is assumed that each unique character read from the document has the same predetermined number of make-ready lines which occupy the first group of line positions sensed by transducer 9. A counter 24 is provided which is responsive to the pulses from pulse shaper 23 in order to generate an output on conductor 25 at the time that the final make-ready pulse is transmitted thereto. Thus, counter 24 indicates when all of the make-ready pulses have been generated so that the system may next anticipate the arrival of the pulses induced by the center group B of lines.

The pulse train emanating from pulse shaper 23 is also directed through a gate 26 if the latter is conditioned by the proper output from a control flip-flop 27. Control flip-flop 27 is assumed to be in a reset or cleared state prior to the arrivel of the character make-ready pulses, so that gate 26 is enabled to pass said make-ready pulses to a synchronized oscillator circuit 28 shown in block form in FIGURE 3. Block 28 includes a variable frequency oscillator for generating a train of clock pulses on conductor 29. These clock pulses are used in the present embodiment to identify the bit positions of the pulses making up the character code. For example, in a system wherein a "0" binary bit is represented by the absence of a pulse in a pulse train, clock pulses are normally utilized in such a fashion that each is coincident in time with a particular pulse or space occurring in the train. In this way, binary "0" bits may be detected and placed in the proper stage of a receiving register. It will be noted in connection with FIGURE 1 that the characters there shown do not provide a recorded clock pulse for each line position within the center region B. Instead, the oscillator in block 28 provides the clock pulses used to identify the code element. However, the scanning system shown in FIGURE 2 is asynchronous in that the distance between the printed characters may not be of uniform length so that the pulses generated from one character may be out of phase with the pulses generated from another character. Furthermore, the scanning rate of a character may differ slightly from that of another due to small changes in the relative motion between the recorded characters and read head 17. The present invention therefore utilizes the initial make-ready pulses to synchronize the clock pulses from circuit 28 in order that they may start in phase with the first scanned line position in center region B. Furthermore, the repetition rate of the make-ready pulses generally indicates the scan frequency which in turn should remain relatively constant over the complete scan of the character. Block 28 may therefore be additionally adapted to vary the frequency of its oscillator in order that the generated clock pulses have the same frequency as that of the make-ready pulses, and consequently, of the code pulses.

A gate 30 is normally conditioned by the reset output of a second control flip-flop 31 to thereby pass the indication from counter 24 that all of the make-ready pulses (eight, in the case of a character shown in FIGURE 1) have been received by the latter. The output from gate 30 thereupon sets first control flip-flop 27 to inhibit gate 26 from passing the next following code pulses to oscillator 28, and to also enable a gate 31 to pass the clock pulses from block 28. By this time, the make-ready pulses have finished their synchronization of the clock pulse oscillator so that the output from gate 31 can be utilized in identifying the binary "1" and "0" values of the code pulses which now begin to arrive from the output of pulse shaper 23. The output from gate 31 is applied to condition gate 32 at each clock pulse time in order that a pulse concurrently appearing from pulse shaper 23 can be gated to the input of a buffer regiser 33. In the embodiment of FIGURE 3, buffer register 33 may be a shift register into which the center portion of the sensed character is introduced bit by bit and shifted right until the entire character code plus related bits is held by the register. Each clock pulse appearing from gate 31 is therefore directed through a slight delay 34 to the shift control input of register 33 in order that the contents of the register may be shifted right immediately after the entering of each "1" or "0" bit from gate 32. Thus, if a clock pulse conditions gate 32 at the time that a pulse appears from pulse shaper 23, the pulse output from gate 32 (which normally represents binary 1) sets the left-most input stage of register 33. This same clock pulse, subsequently delayed, thereafter shifts all of the bits in register 33 one position to the right which thereby clears the left-most register stage in preparation for entry of the next binary bit of the character word. If no pulse appears from the output of pulse shaper 23 at the time that a clock pulse is received by gate 32, then the input stage of register 33 remains clear indicating the entry of a binary "0" bit into this position. This binary "0" bit is thereafter shifted one position to the right. Thus the character code and related bits are entered bit by bit into register 33 by means of the synchronized clock pulses generated by block 28.

After the complete character word has been entered into buffer register 33, the shifting operation ceases in order that the word will not be destroyed until read by utilization circuits 22. If a sprocket element (of value 1) is included in the character word, then this bit resides in the right-most stage of register 33 by the time that the complete word is stored. Thus, the shifting of this bit into the right-most stage of the register indicates that the complete character word has been sensed and entered into the register. An output from this stage of the shift register is thereby used to reset the first control flip-flop 27 in order to inhibit gate 31 from passing any more clock pulses for this particular character. In the absence of clock pulses from gate 31, gate 32 is unable to pass any of the succeeding terminate pulses from pulse shaper 23, as well as preventing any further shift in register 33. Thus, the word in register 33 remains stored until called for by utilization circuits 22.

In some systems, it may be desirable to employ the terminate pulses, which are generated by the printed lines in the last group C of the character, to insure that there is no ambiguity in determining the exact location of the central character group B. If so, then the shifting of the sprocket pulse into the right-most stage of register 33 can also be utilized to set a second control flip-flop 31 and clear counter 24 in preparation for receiving the terminate pulse group from pulse shaper 23. Counter 24 now indicates when all of the predetermined number of terminate pulses have been received, since in the preferred embodiment there are the same number of terminate pulses as make-ready pulses. Upon the requisite number of terminate pulses being received by counter 24, the output on conductor 25 again attempts to pass through gate 30 in order to set flip-flop 27. However, this latter function is not now desired inasmuch as there is no need for clock pulses from gate 31 at this time. Thus, the set condition of flip-flop 31 during the scanning of the terminate group deconditions gate 30 so that it is not able to pass any signal from conductor 25. This indication on conductor 25 is, however, used to reset flip-flop 31 in preparation for the scanning of the next following character. A small delay 35 may be inserted, as shown, in order to insure that the clearing of flip-flop 31 does not permit the conditioning of gate 30 until after this indication on conductor 25 disappears. The clearing of flip-flop 31 also may be utilized to clear counter 24 which in turn terminates any signal condition on conductor 25. Since there are no recorded magnetic lines between characters on the carrier surface, counter 24 remains in its clear condition until the read head senses the first of the make-ready pulses comprising the next following character. Flip-flops 27 and 31 are also seen to be in their cleared conditions at the beginning of each character sense cycle.

Subsequent to the sensing of the entire character, a signal may now be passed to utilization circuit 22 which informs it that register 33 contains a word identifying a sensed character. This signal is generated from a coincidence circuit 36 which is responsive to the cleared conditions of boh flip-flops 27 and 31 as well as to the presence of a sprocket bit in shift register 33. Thus, as soon as counter 24 receives the last of the terminate pulses from pulse shaper 23, it resets flip-flop 31 to cause circuit 36 to generate an output. This output is applied to the utilization circuit via a conductor 37. Thereafter, the content of register 33 may be transferred to the utilization circuit via one or more gates 38 in response to a gating signal applied via conductor 39. The technique for reading the contents of register 33 may either be parallel (as indicated by the cabled conductors 40) or may be serial, with the latter being controlled by clock pulses emanating from utilization circuit 22 so as to synchronize the read operation with the circuit 22 internal circuitry.

FIGURE 4 shows one form of a synchronized oscillator which may be utilized as block 28 in FIGURE 3. Further details of this circuit are disclosed in U.S. Patent to Bailey, 2,617,040. In general, the square top make-ready pulses are fed from gate 26 through a coincidence stage 42 via conductor 40. Coincident circuit 42 also receives square top clock pulses from the output 29 of a relaxation oscillator 43. The coincidence stage 42 is so arranged that it gives an output only when the make-ready pulses and the feedback clock pulses are both at their positive maximum peak. The output from coincidence 42 is applied to a rectifier 44 and thence to a low pass filter 45. The output from filter 45 is applied to the frequency control electrode of oscillator 43. It is assumed in FIGURE 4 that the natural frequency of oscillator 43, with zero bias on the frequency control electrode, is less than the minimum frequency ever expected of the make-ready pulses. When the make-ready pulses are applied, two sets of pulses are applied to coincidence stage 42, those of the make-ready pulses and those of the generated clock pulses. Positive peaks of the two sets of pulses will frequently overlap in time so that a number of current pulses will occur in the coincidence output. These current pulses from the coincidence stage produce a higher voltage bias level on the frequency controlling electrode of oscillator 43 so that its frequency increases until equal to the frequency of the synchronizing make-ready pulses. In addition, the clock pulses are placed in phase with the incoming make-ready pulses. When the make-ready pulses vanish completely from the input to coincidence 42 due to the closing of gate 26, the decay of the oscillator frequency to its own natural frequency takes place slowly due to the time delay introduced by the low pass filter 45. However, it is assumed that the frequency of the clock pulses from oscillator 43 remains approximately the same as the frequency of the make-ready pulses during the time that the character code portion is being scanned. In addition, gate 26 is seen to be open once more during sampling of the terminate pulses such that the relaxation oscillator 43 is again synchronized to the frequency of the scanning mechanism. Other well known circuits may also be employed for the synchronized oscillator of block 28 which may differ from those disclosed in the above-identified patent. Therefore, this invention is not to be limited to the details of the Bailey circuit.

FIGURE 5 illustrates how the circuit in FIGURE 3 may be modified to provide parallel entry of the character code into the buffer register as opposed to the serial entry shown in FIGURE 3. This modification occurs within the dot-dash rectangle 50. A buffer register 51 is then substituted for the shift register 33, such that each stage *m* of register 51 has an individually associated input gate $52^1$ through $52^M$. Upon occurrence of clock pulses on conductor 46, each pulse on conductor 47 is applied via gate 53 to each of the register gates 52. However, only one of these gates 52 is energized at any one time so as to place the binary bit pulse into the appropriate stage of register 51. The sequential conditioning of gates 52 is accomplished by means of a counter 54 which is stepped during each clock pulse interval by means of the slightly delayed clock pulse on conductor 46. Thus, prior to reception of the character word from pulse shaper 23, counter 54 is assumed to be reset so that only gate $52^1$ is conditioned to pass a pulse appearing on conductor 47. Each clock pulse on conductor 47 samples the bit position time of the pulse train and thereafter steps counter 54 in order to condition the next sequential gate 52. Thus, the character word is placed in the register 51 bit by bit, but without the shift operation as performed in FIGURE 3.

Upon the last bit of the character word being placed into register 51, counter 54 is subsequently stepped to its last stage which thereby indicates that register 51 is completely filled. This last stage of counter 54 thereupon generates a signal on conductor 48 which is utilized in the same manner in the circuit of FIGURE 3 as is the signal generated by the sprocket bit in shift register 33. In lieu of this additional stage in counter 54, an output may be obtained from a stage in register 51 containing a sprocket bit if such bit is the last to be entered. In this case, the sprocket line position would follow the character code line positions in center region B when considering the order of scan.

Other arrangements may be provided similar to the configuration in FIGURE 5. For example, the gate conditioning counter stages might be a portion of counter 24, which itself is cleared at commencement of the character code pulses and could thereafter be stepped by clock pulses to enter the word into register 51.

In practice, it may be found somewhat difficult to align the gap of read head 17 in exact parallel relationship with the fine line structure of the recorded character. In order to avoid the deleterious results of skew smearing which might occur if the air gap of a single read head scans two or more magnetic lines of the character simultaneously, the arrangement of FIGURE 6 can be employed. In FIGURE 6, three electrically insulated magnetic heads 52, 53, and 54 are provided, each scanning an individual one of three horizontal zones I, II, and III which are common to all of the recorded characters on the same print line. For example, in FIGURE 7 several different characters are shown each of a height extending through the three zones. In at least one of the zones, each character has its gross outline extending for the entire character width so that the transducer sweeping this zone is able to scan the entire number of line positions making up each character. This means therefore that at least one magnetic head of the three is positioned to scan the full number of make-ready lines, the full number of terminate lines, and the median character code lines. For example, for the character A, the transducer scanning zone III sweeps over the lower portion of both legs as well as the central horizontal bar which contains in part the character code. For the letter C, the transducers associated with zones I and III each are responsive to the full number of make-ready, terminate, and character code line positions. The same is true with letter I. For the letter K, only that transducer sweeping the central zone II is able to sense all of the character line positions, since there is a hiatus in the character gross outline in zones I and III. For the character M, only that transducer in zone I is effective to identify the character. In the case of letters Y, X, and G, the zones in which the transducers scan the full number of character line positions is believed to be obvious. Since each transducer sweeps only one-third of the total character height, it is therefore seen that the alignment of the air gap of each is simplified, since a slight angular skew can be tolerated without the transducer scanning more than one magnetic line position at a time. Furthermore, the use of fewer or more scanning zones for the characters is also permissible as long as alignment of the heads can be accomplished without intolerable skew smearing.

FIGURE 8 illustrates how each transducer 9 can be connected to a read circuit 21 whose construction is as shown in FIGURES 3, 4, or 5, so that the utilization circuit 22 can be supplied with the character identification. As before noted, each transducer 9 sweeps one of the character zones in which may reside all or some of the full complement of line positions. Thus, each buffer register within the read circuit 21 may or may not contain the character code and related elements, depending upon whether its associated transducer is responsive to a sufficient number of recorded make-ready lines in order to set flip-flop 27. If the associated transducer is further responsive to the complete number of terminate lines as well as to all of the make-ready lines, then the circuit in the read unit 21 operates as above described to generate a signal via its conductor 37 indicating that a valid character code combination resides in its buffer register. Utilization circuit 22 is thus responsive to a signal appearing on any one of the conductors 37 in order to sample its associated buffer register to extract the information. If two or more of the buffer registers contain valid code combinations then utilization circuit 22 may sample both of these registers at the same time. Although the outputs of gates 38 are commoned together, there would be no mutilation of the bits in this case since both registers hold the same bit configuration. The reset output on conductor 41 from circuit 22 is thereafter applied to the read circuits in order to assure that each will be conditioned to respond to the next character scanned.

FIGURE 9 illustrates alternative transducer means for generating an output pulse for each recorded line of the character. The scheme in FIGURE 9 shows how photoelectric means may be utilized to scan a character divided into three zones I, II, and III. For example, a source of light 60 may be collimated by lens 61 and passed through three slits in shield 62 to form three beams each having a width equal to the height of its associated zone. These three beams impinge upon and reflect from the carrier member 11 at a sensing position through which the character is passed. The visually recorded material in the character line positions is also optically distinguishable from the surface of member 11 so that each reflected beam changes in intensity as it detects a line which is moved into its scan position. Each reflected beam is gathered and focused by lenses 63, 64, and 65 from which it is applied to a respective one of the photo-detectors 66, 67, and 68. The output of each photo-detector is applied via an amplifier to the input of one of the read circuits 21 in the manner illustrated in FIGURE 8. Therefore, a train of pulses is generated by each photo-detector 66 depending upon the number of optically distinguishable lines recorded in the line positions of a character. If desired, one single beam having a width equal to the total height of each character may be utilized instead of three separate beams. In this case, only one read circuit 21 would be required.

While certain preferred embodiments of the present invention have been shown and described, modifications thereto may be obvious to person skilled in the art without departing from the spirit of the invention. Therefore, the invention is not to be limited except as defined in the appended claims.

I claim:

1. In a character reading system for identifying a human language character made up of parallel fine lines of visually distinguishable and mechanically sensible material recorded on a carrier surface said lines of material disposed in of a plurality of closely spaced parallel line positions with said lines being interrupted or terminated in a manner to provide a visual gross outline of said character, where one or more of said lines are selectively omitted from a predetermined group thereof in order to provide a pattern of pulses to incorporate digital encoding of said character within its minute structure and where said predetermined group is intermediate a group of make-ready lines of a first predetermined number more than one and a group of terminate lines of a second predetermined number more than one, the combination comprising:

(a) single line transducer means disposed to scan said recorded character in a direction substantially at right angles to its parallel line structure for generating a pattern of electrical pulses one pulse for each line position having material therein such that the first appearing pulses in said pattern are those generated by the lines in said make-ready group and the last appearing pulses in said pattern are those generated by the lines in said terminate group;

(b) first means for counting said first appearing pulses to indicate when said first predetermined number has been generated;

(c) a register;

(d) gating means responsive to said first means indication to fill said register with the pulses next following said first appearing pulses;

(e) second means indicating when all of said predetermined code group line positions should have been scanned by said transducer means; and (f) third means responsive to said second means indication for counting said last appearing pulses to indicate when said second predetermined number has been generated.

2. In a system according to claim 1 when said line material comprising said character is magnetized, wherein said transducer means comprises a magnetic read head having an air gap substantially parallel to the line structure of said recorded character.

3. In a system according to claim 1 when the line material comprising said character has optical characteristics different from those of said carrier surface, wherein said transducer means comprises an optical scanner of the beam type which converts into pulse energy changes in beam intensity due to impingement of the beam on said line material.

4. In a system according to claim 1, wherein said gating means includes a variable frequency oscillator synchronized by said first appearing make-ready pulses to generate a clock pulse train in phase and of the same frequency as said code pulses, with said clock pulses being used to enable said gating means to sequentially fill code order positions in said register with code pulses of corresponding order.

5. In a system according to claim 1, wherein fourth means is further provided which responds to indications by at least both said first and said third means to signify that said register is properly filled with a valid code group identifying the scanned recorded character.

6. In a system according to claim 4 wherein fourth means is further provided which responds to indications by at least both said first and said third means to signify that said register is properly filled with a valid code group identifying the scanned recorded character.

7. In a character reading system for identifying a human language character made up of parallel fine lines of visually distinguishable and mechanically sensible material recorded on a carrier surface one in each of a plurality of closely spaced parallel line positions which are transverse to a plurality of parallel scanning zones, with said lines being interrupted or terminated in a manner to provide a visual gross outline of said character a portion of which extends the entire character width in at least one of said scanning zones, and where one or more lines are selectively omitted from a predetermined group of said spaced line positions in order to incorporate digital encoding of said character within its minute structure and where said predetermined group is intermediate a group of make-ready line positions of a first predetermined number more than one and a group of terminate line positions of a second predetermined number more than one, the combination comprising:

(a) a plurality of transducer means each individual to a different one of said recorded character zones for scanning the portion of said character therein in a direction substantially at right angles to its parallel line structure for generating a train of electrical pulses one for each line position having material therein such that the lrst appearing pulses in said train are those generated by the lines in said make-ready group and the last appearing pulses in said train are those generated by the lines in said terminate group;

(b) a plurality of first means each responsive to a said pulse train from a different one of said transducer means for counting said first appearing pulses therein to indicate when said first predetermined number has been generated;

(c) a plurality of registers one for each said transducer means;

(d) a plurality of gating means each responsive to said indication from a different said first means for filling the associated said register with the pulses in the associated said pulse train next following said first appearing pulses;

(e) a plurality of second means each indicating when all of said predetermined code group line positions should have been scanned by a different said transducer means;

(f) a plurality of third means each responsive to a different said second means indication for counting said last appearing pulses in the said associated pulse train to indicate when said second predetermined number has been generated;

(g) a plurality of fourth means each responsive to indications by at least both said first and said third means associated with a different transducer means to signify when said associated register is properly filled with a valid code group identifying the scanned recorded character; and (h) fifth means simultaneously reading out from each register whose associated fourth means signifies that said register is filled with a said valid code group.

8. In a system according to claim 7, wherein each said gating means includes a variable frequency oscillator synchronized by said first appearing make-ready pulses to generate a clock pulse train in phase and of the same frequency as said code pulses, with said clock pulses being used to enable said gating means to sequentially fill code order positions in its associated said register with code pulses of corresponding order.

9. A system for identifying a human language character which comprises in combination:

(a) a carrier member having a surface;

(b) a human language character comprised of parallel fine lines of visually distinguishable and mechanically sensible material recorded on said carrier surface, said lines of material disposed in a plurality of closely spaced parallel line positions with said lines being interrupted or terminated in a manner to provide a visual gross outline of said character and where one or more of said lines are selectively omitted from a predetermined group thereof in order to incorporate digital encoding of said character within its minute structure;

(c) transducer means to scan said recorded character in a direction substantially at right angles to its parallel line structure for generating a pattern of electrical pulses, said pattern including one pulse being generated for each of said lines present and one non-pulse period for each of said omitted lines present;

(d) means responsive to said pattern of pulses for storing as electrical signals those pulses generated by line material recorded in said predetermined code group, said electrical signals to define said character by virture of said pattern; and (e) means to indicate the time during which said transducer means scans the line positions of said predetermined code group, said last mentioned means being connected to said means responsive to said pattern of pulses.

10. A system according to claim 9 wherein there is further included gating means connected to said means to indicate and responsive to the time indication of said last mentioned means for passing only those pulses which represent recorded line material in said predetermined code group.

References Cited

UNITED STATES PATENTS

| | | | |
|---|---|---|---|
| 3,044,696 | 7/1962 | Feissel | 235—61.12 |
| 3,034,712 | 5/1962 | Mead | 235—61.12 |
| 3,058,093 | 10/1962 | Vernon | 235—61.11 |
| 2,936,112 | 5/1960 | Dickinson | 235—61.11 |
| 3,005,106 | 10/1961 | Wilkins | 340—146.3 |
| 3,104,370 | 9/1963 | Rabinow | 340—146.3 |
| 3,025,495 | 3/1962 | Endres | 340—146.3 |

DARYL W. COOK, *Acting Primary Examiner.*

MALCOLM MORRISON, *Examiner.*

J. I. SCHNEIDER, P. J. HIRSCHKOP, *Assistant Examiners.*